United States Patent [19]

Yamada et al.

[11] Patent Number: 5,404,156
[45] Date of Patent: Apr. 4, 1995

[54] METHOD AND APPARATUS FOR FORMING A FULL-COLOR IMAGE

[75] Inventors: Kunio Yamada; Akira Ishii, both of Ebina, Japan

[73] Assignee: Fuji Xerox Co., Ltd., Tokyo, Japan

[21] Appl. No.: 93,586

[22] Filed: Jul. 19, 1993

[30] Foreign Application Priority Data

Jul. 25, 1992 [JP] Japan .................... 4-218514

[51] Int. Cl.⁶ .................... H04N 1/40; G03G 15/01
[52] U.S. Cl. .................... 347/115; 347/129; 355/327; 358/533; 358/534
[58] Field of Search .................... 355/326 R, 327; 358/500, 506, 530, 533, 534; 346/157, 160

[56] References Cited

U.S. PATENT DOCUMENTS

| | | | |
|---|---|---|---|
| 4,012,137 | 3/1977 | Goren | 355/327 |
| 4,090,786 | 5/1978 | Bobbe | 355/328 |
| 4,903,123 | 2/1990 | Kawamura et al. | 358/533 |
| 4,922,335 | 5/1990 | Outa et al. | 358/506 |
| 4,980,757 | 12/1990 | Nishigaki | 358/533 |
| 5,055,923 | 10/1991 | Kitagawa et al. | 358/534 |
| 5,184,213 | 2/1993 | Ishida | 358/500 |

FOREIGN PATENT DOCUMENTS

| | | |
|---|---|---|
| 53-19201 | 2/1978 | Japan . |
| 1-228845 | 9/1989 | Japan . |
| 1-228846 | 9/1989 | Japan . |
| 1-228848 | 9/1989 | Japan . |
| 1-228849 | 9/1989 | Japan . |

*Primary Examiner*—Fred L. Braun
*Attorney, Agent, or Firm*—Oliff & Berridge

[57] ABSTRACT

A full-color image printing method and apparatus operate to form mono-color toned images of individual color components using multiple, e.g., four, mono-color imaging units provided in correspondence to the color components and single-lined screen processors provided in correspondence to the imaging units, and overlap the mono-color toned images sequentially to produce a full-color image on a sheet of print paper. The screen angle is made different among the mono-color toned images and the line pitch of the screen is made virtually equal for all mono-color toned images with the intention of retaining a high-grade color quality and preventing the degradation of picture quality such as a degraded tone quality.

7 Claims, 14 Drawing Sheets

METHOD AND APPARATUS FOR FORMING A FULL-COLOR IMAGE

BACKGROUND OF THE INVENTION

1. Field of the Invention

The present invention relates to a method and apparatus for printing a full-color toned image based on the scheme of electrophotography, and particularly to an improved method and apparatus for printing a full-color toned image by forming mono-color images by means of mono-color imaging units provided separately for individual color components of full-color images, and overlapping the mono-color images.

2. Description of the Prior Art

Conventional full-color printing apparatus including full-color copy machines and full-color printers based on the scheme of electrophotography have used the technique of single-lined screen, which is generally known in the field of printing, for printing full-color toned images. The single-lined screen used for these machines has been of the type called "constant-angle single-lined screen" in which the screen angle is constant for all color components, e.g., yellow, magenta, cyanine (and black), of full-color images.

Many of these full-color printing apparatus are designed to attain the single-line structure by writing an image based on the raster scanning of a laser beam so that image information of adjacent rasters is continuous in the ancillary scanning direction. The machines have generally employed the "90° single-lined screen", which is named as such because the screen angle is 90° with respect to the main scanning direction.

However, the conventional full-color image printing apparatus of "tandem type", in which images of individual color components are formed by means of separate mono-color imaging units and these mono-color images are overlapped on a sheet of print paper, have suffered the disparity of imaging characteristics and positional accuracy among the mono-color imaging units. Therefore, in many cases, a produced full-color image has degraded accuracy of color registration (write position of each mono-color image) in the main scanning direction and the single-lined screens of all color components do not overlap precisely, resulting in the fluctuation of visual color.

In order to solve the above-mentioned technical problem, there is a method based on the scheme of screen rotation known in the field of printing, in which the screen angle is made different among the color components so that the single-lined screens of all color components overlap at random thereby to make even the produced color (refer to Japanese Patent Unexamined Publication No. 53-19201).

In this case, screen angles other than 90° can be attained by shifting certain values specific to individual color components, at every raster scanning with respect to the usual constant-angle single-lined screen, and screen rotation of different screen angles for individual color components can be accomplished.

However, when this method is used to vary the screen angle greatly (e.g., a screen angle of 45° by setting the shift value equal to a half line pitch of the screen), the number of lines increases by $1/\sin\alpha$ (where $\alpha$ is the screen angle, i.e., 45°) relative to the original screen, i.e., a 1.41-fold increase in the number of lines in this example and therefore it necessitates a higher resolution of imaging. The number of lines of the single-lined screen is already set as high as possible within the ability of the apparatus in general with the intention of achieving the highest picture quality based on the highest resolution, and therefore the above-mentioned screen rotation demands much higher resolution beyond the ability of the apparatus and it can result in a degraded picture quality such as the degradation of tone quality.

Moreover, a great difference in the line pitch among color components results in a great difference in resolution among mono-color images, and the quality of full-color image produced by overlapping the mono-color images will be deteriorated, e.g., mono-color images of lower resolution will be emphasized.

SUMMARY OF THE INVENTION

The present invention is intended to overcome the foregoing prior art deficiencies, and its prime object is to provide a method and apparatus for forming a full-color image capable of retaining a high-grade color quality and preventing the degradation of picture quality such as a degraded tone quality.

The present invention resides in a full-color image forming method based on a plurality of, e.g., four, mono-color imaging units 1 (1a–1d) as shown in FIG. 1 provided in correspondence to individual color components of full-color images, in which mono-color toned images of the color components are formed through the single-lined screen process of the mono-color imaging units and thereafter the mono-color toned images are overlapped sequentially thereby to produce a complete full-color image, wherein the screen angle is made different among the mono-color toned images and the line pitch of the screen is made virtually equal for all mono-color toned images.

The present invention resides in a full-color image forming apparatus including a plurality of, e.g., four, mono-color imaging units 1 (1a–1d) as shown in FIG. 1 provided in correspondence to individual color components of full-color images and adapted to form mono-color images of the color components, and single-lined screen process means 2 (2a–2d) provided in correspondence to the mono-color imaging units and adapted to append tone information to the mono-color images in the form of single-lined screens each extending along the main scanning direction, in which mono-color toned images formed by the mono-color imaging units are overlapped sequentially thereby to produce a complete full-color image, wherein the apparatus further includes control means 3 which shifts the write timing of the single-lined screen for each mono-color toned image by a certain value specific to the color component at every raster scanning so that the screen angle varies among the color components, and screen frequency adjusting means 4 which adjusts the screen spatial frequency of the main scanning direction for each mono-color toned image so that the line pitch of the screen is virtually equal for all mono-color toned images.

The screen angle set by the screen write control means 3 is determined only by the shift value of the screen write position and the raster pitch of ancillary scanning direction, and it is independent of the line pitch of the screen. Accordingly, the screen angle can be set independently of the number of lines of the single-lined screen.

Although any difference of screen angle among color components is basically accepted, a too small difference of screen angles can incur the emergence of Moire, and therefore it is desirable to set the difference of screen angles as large as possible from the viewpoint of preventing the Moire.

The screen write control means 3 may be designed to select the shift value arbitrarily with the intention of high-accuracy performance, or may be designed to set the shift value in terms of 1/n (n is a positive integer greater than 1) of the standard line pitch A in the main scanning direction by use of a delay means with the intention of simpler structure.

The screen frequency adjusting means 4 may be designed to generate separate spatial frequencies for individual color component with the intention of high-accuracy performance, or may be designed to share a standard spatial frequency with the intention of simpler structure through the provision of a standard spatial frequency generation means which generates the standard spatial frequency of the main scanning direction for the standard single-lined screen and a frequency division means which demultiplies the standard spatial frequency appropriately so that the number of lines of the screen in the main scanning direction is reduced.

Although the screen frequency adjusting means 4 is intended to virtually equalize the line pitches for all mono-color toned images, differences of screen pitch among the color components in such extent that the difference of resolution is not noticeable for the human eyes will impose no problem. Specifically the difference is set within the range of ±15% with respect to the line pitch of the standard single-lined screen.

The operation of the inventive method and apparatus will be briefed by taking examples. The screen write control means 3 in FIG. 1 shifts the write timing of the single-lined screen of the toned image of each color component by a certain value d specific to the color component at every raster scanning as shown in FIG. 2 so that the screen angle $\theta$ varies among the color components. The screen frequency adjusting means 4 adjusts the standard spatial frequency of each color component in the main scanning direction thereby to set the line pitch A of each color component in the main scanning direction so that the line pitch B at the screen angle $\theta$ for each mono-color toned image is made virtually equal.

Accordingly, in case the single-lined screen S of the toned image G0 of one color component has a screen angle of $\theta = 90°$ and a line pitch of A, if the screen S of the toned image G1 of another color component has a screen angle $\theta = \theta 1$ which is unequal to 90° and a screen pitch B unequal to A, the toned images of these color components do not overlap in a state of constant shift even if the image write positions for these color components are different from each other, but instead these images will overlap at random. Consequently, the produced color resulting from the overlapped toned images is stable, instead of having an emphasized toned image of one color component owing to virtually equal resolutions of all mono-color toned images.

DESCRIPTION OF THE PREFERRED EMBODIMENTS

Embodiments of this invention will be explained in detail with reference to the drawings.

Embodiment 1

Figure 1:
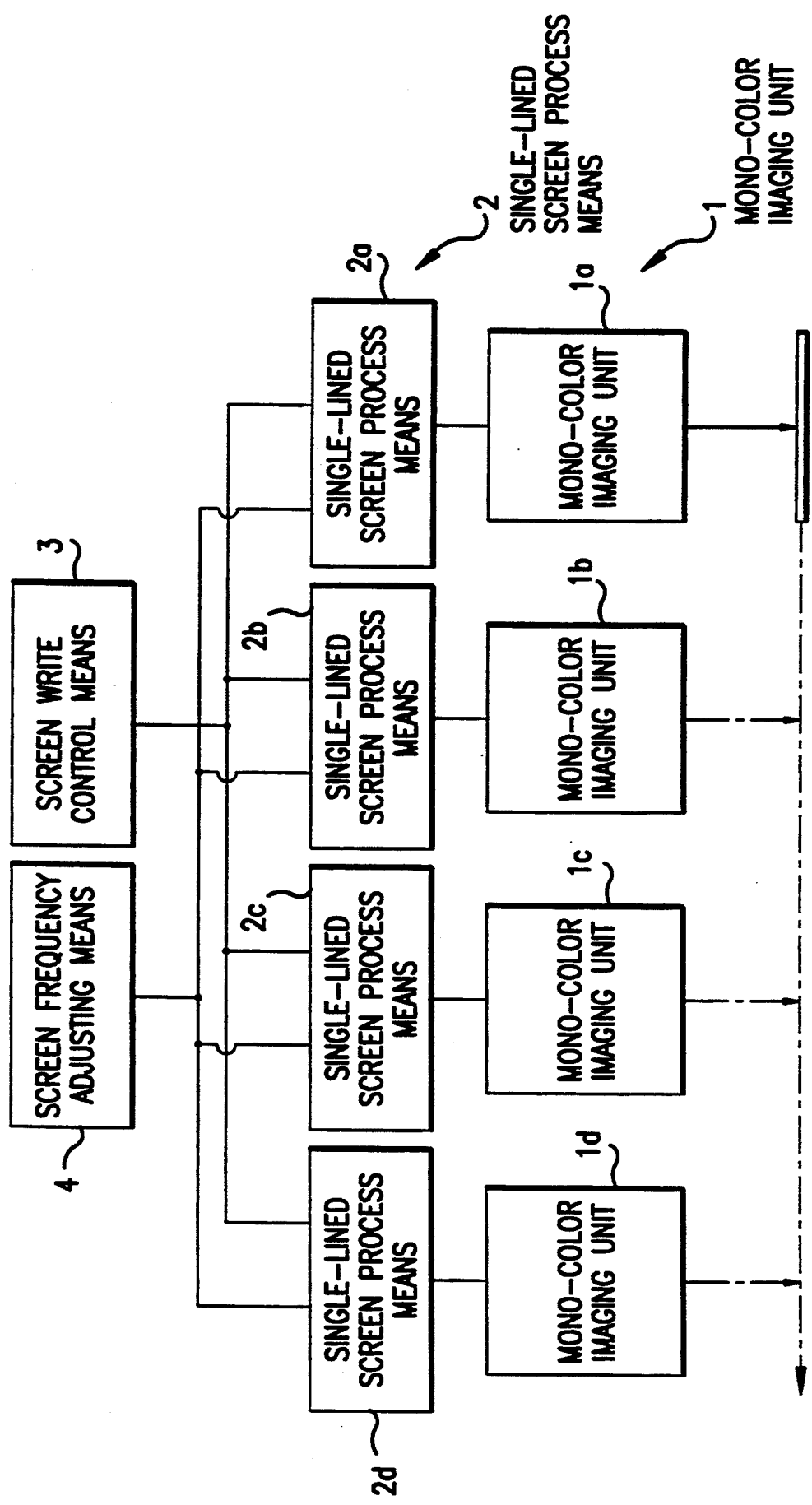
FIG. 1 is a block diagram of the full-color image printing apparatus based on this invention.
Figure 2:
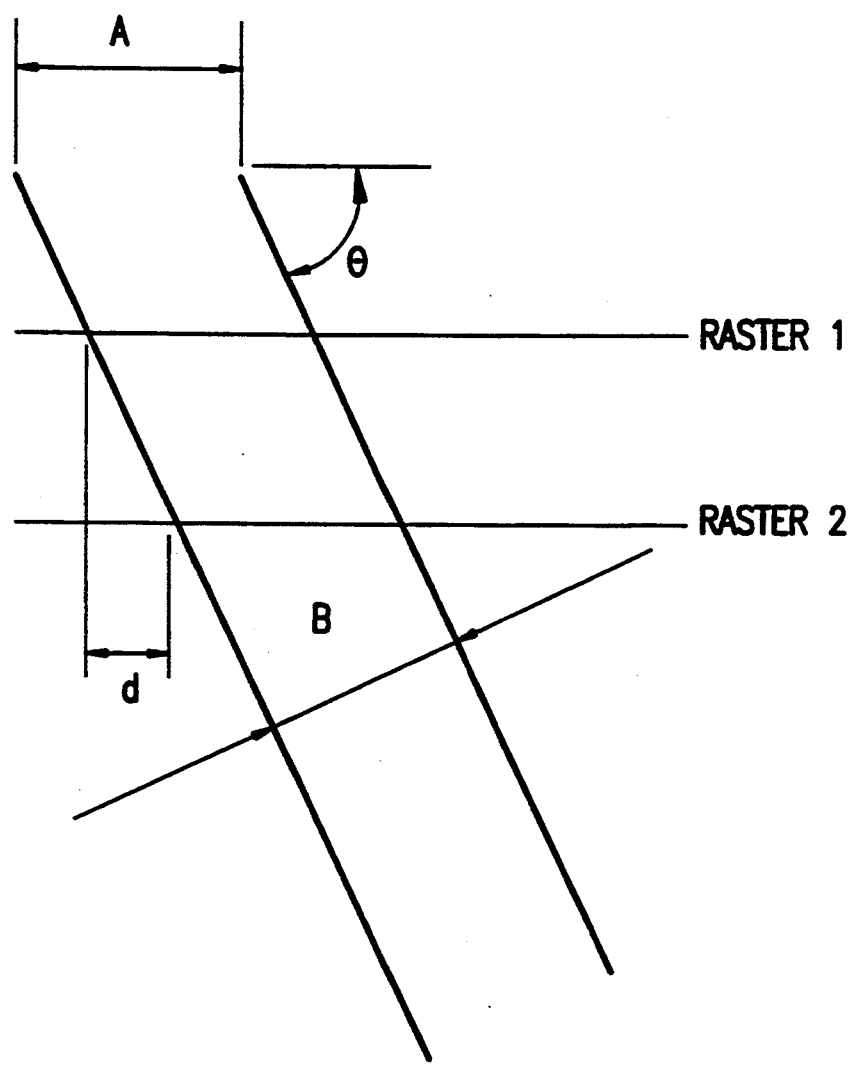
FIG. 2 is a diagram explaining the principle of operation of this invention.
Figure 3:
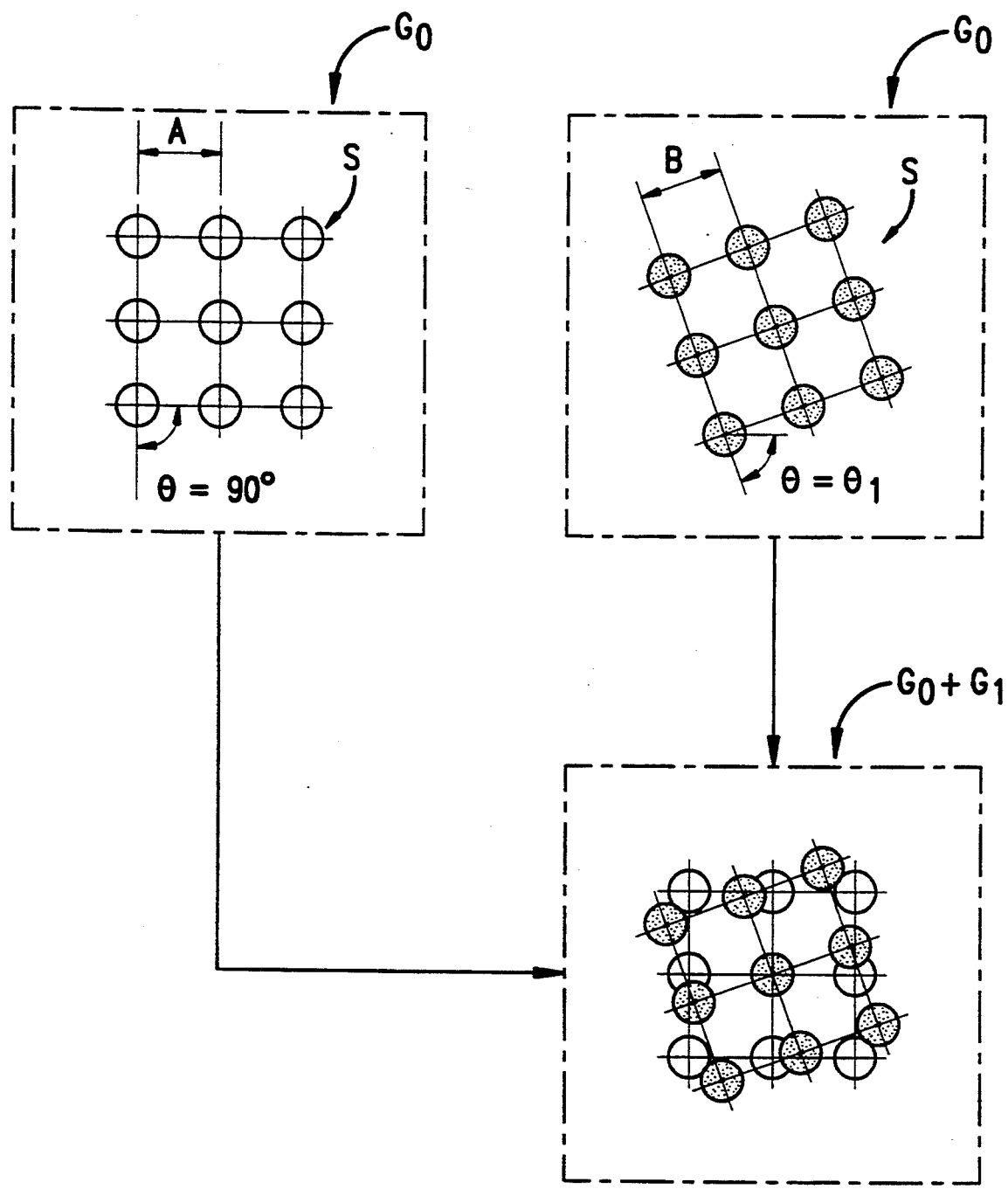
FIG. 3 is a diagram used to explain the full-color imaging process based on this invention.
Figure 4:
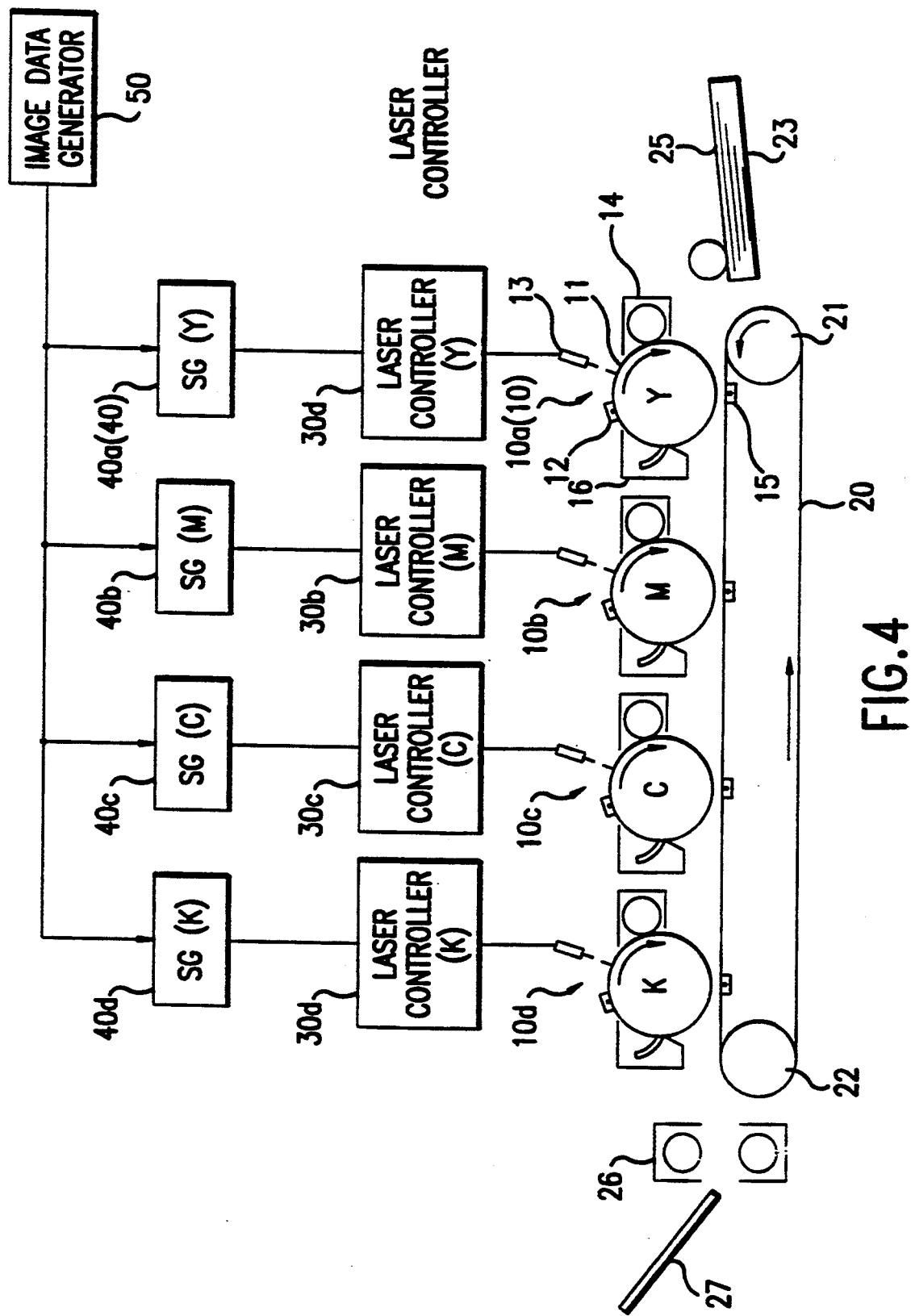
FIG. 4 is a block diagram of the full-color printer based on a first embodiment of this invention.

FIG. 4 shows in block diagram the arrangement of the full-color printer based on an embodiment of this invention. The full-color printer includes four mono-color imaging units 10 (10a–10d) for forming images of color components which are yellow (Y), magenta (M), cyanine (C) and black (K) in this embodiment, and a paper transportation belt 20 for moving a sheet of print paper 25 to the image transfer positions of the imaging units 10 sequentially at specified timings.

Each mono-color imaging unit 10 comprises a photosensitive drum 11, a charging device 12 for charging the photosensitive drum 11 preliminarily, a laser source 13 for producing a latent image of the mono-color toned image on the surface of the drum 11 which has been charged preliminarily, a developer 14 for developing the latent image on the drum 11 with toner of the respective color components a transfer device 15 for transferring the toner image formed on the drum 11 onto the print paper 25 which has been moved to the transfer position, and a cleaner 16 for removing the residual toner from the drum surface.

The paper transportation belt 20, which runs between a driving roll 21 and a driven roll 22, operates in response to the rotation of the driving roll 21 to take a sheet of print paper 25 which is fed from a paper supply cassette 23, move the paper to pass the image transfer positions of the mono-color imaging units 10 sequentially while sticking the paper on the belt surface electrostatically, and, after the toner images on the paper are fixed by a fixing device 26, deliver the printed paper to a delivery tray 27.

The full-color printer of this embodiment further includes laser controllers 30 (30a–30d) for implementing the pulse-width modulation for the laser beam from the laser sources 13 in accordance with image information of the color components, and screen generators 40 (40a–40d) for implementing the single-lined screen process for image data of individual color components supplied sequentially from an image data generator 50.

Figure 5:
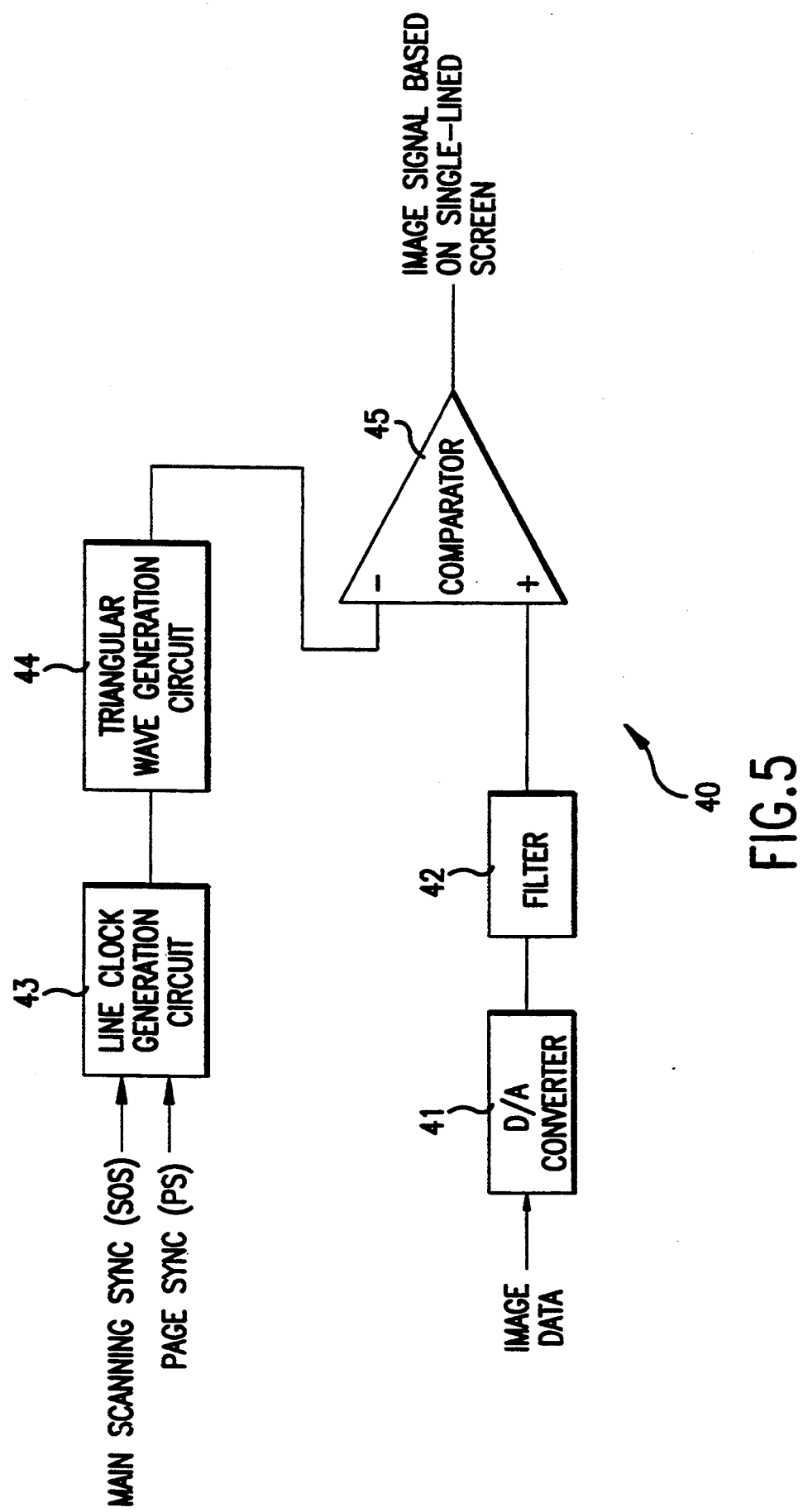
FIG. 5 is a block diagram showing a specific arrangement of the screen generator used in the first embodiment.

FIG. 5 shows a specific arrangement of the screen generator 40 based on this embodiment. It comprises a D/A converter 41 for converting the toned image data sent from the image data generator 50 into an analog image signal, a filter 42 for eliminating high-frequency components from the image signal, a line clock generation circuit 43 which produces a base clock of the single-lined screen (will be termed "line clock" hereinafter) of each color component in synchronism with a main scanning sync (SOS) signal indicative of the write start timing in the main scanning direction and a page sync (PS) signal indicative of the write start timing of a page, a triangular wave generation circuit 44 which produces a triangular wave in synchronism with the line clock, and a comparator 45 which compares the toned image signal coming out of the filter 42 with the triangular wave to extract a single-lined screen image signal having a pulse width dependent on the magnitude of the toned image signal.

Although a triangular wave is used in producing the single-lined screen in this embodiment, it may be replaced with a sinusoidal wave or the like.

The screen generator 40 of this embodiment produces the image signal which is based on the single-lined screen that is equivalent to a raster pitch of 400 lines/inch in the ancillary scanning direction, and the line clock generation circuit 43 produces a clock at a different timing for each color component so that the screen pitch is equal and the screen angle is unequal among the color components.

Figure 6:
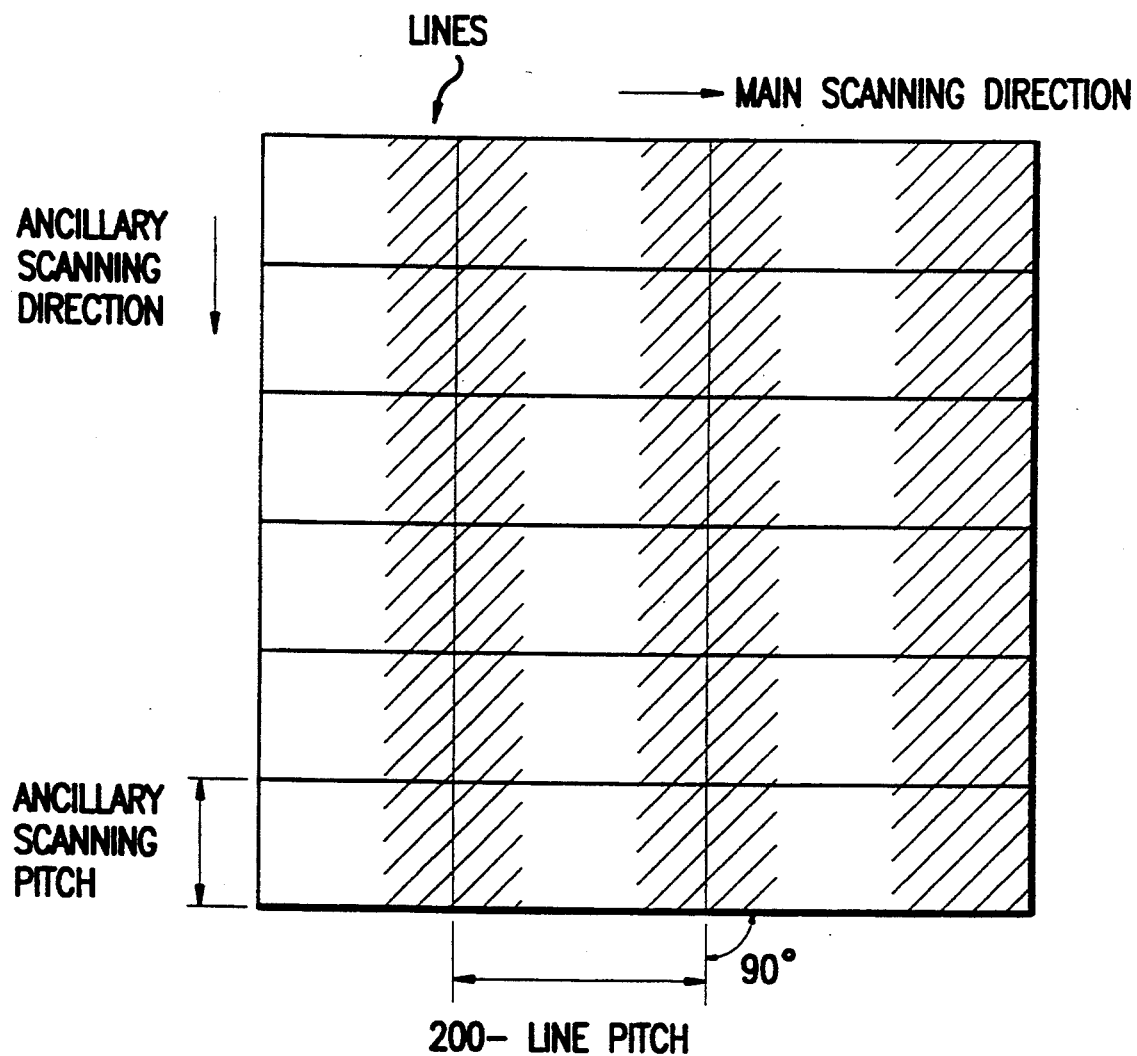
FIG. 6 is a diagram used to explain the single-lined screen for the yellow image based on the first embodiment.
Figure 7:
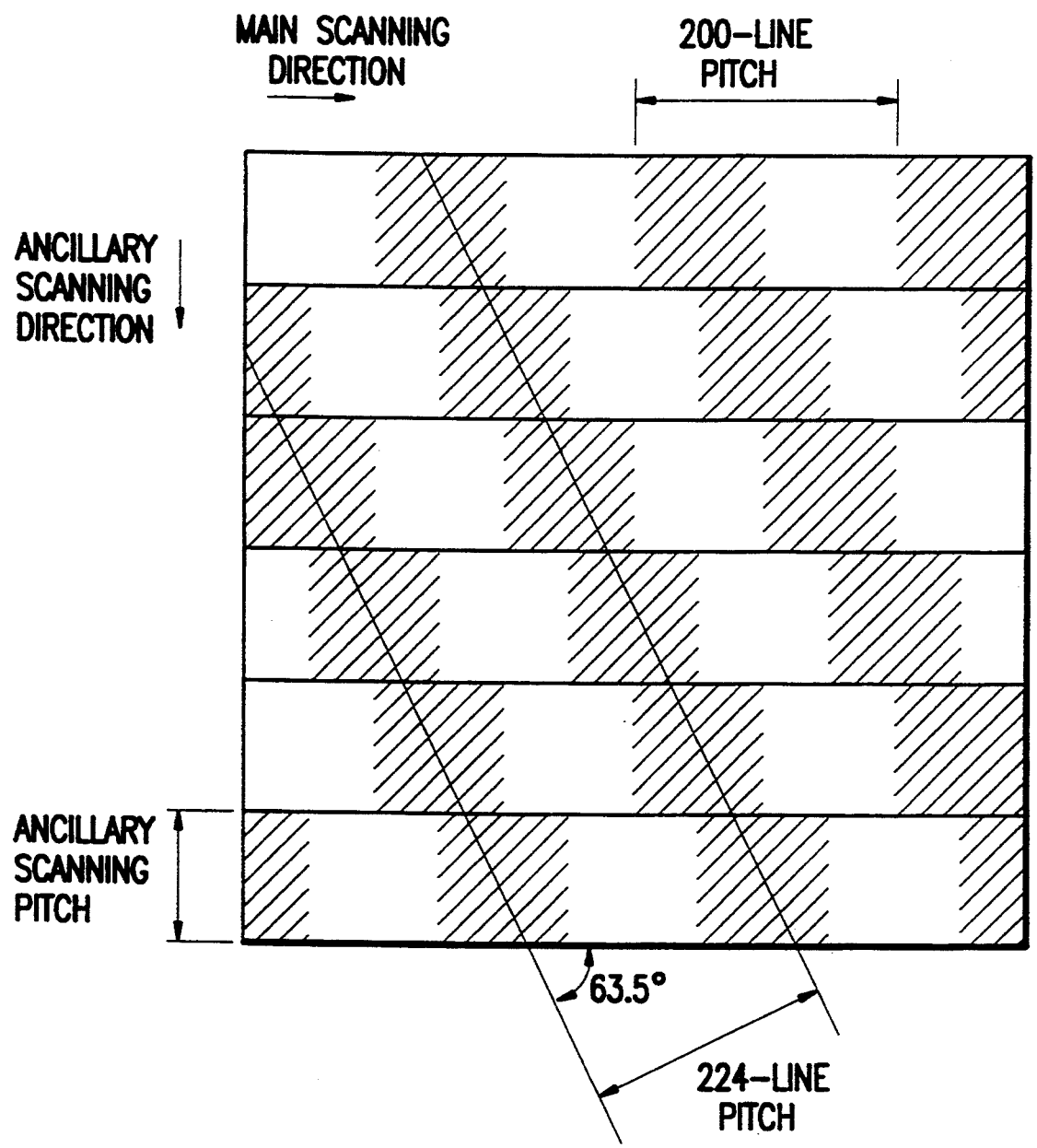
FIG. 7 is a diagram used to explain the single-lined screen for the magenta image based on the first embodiment.
Figure 8:
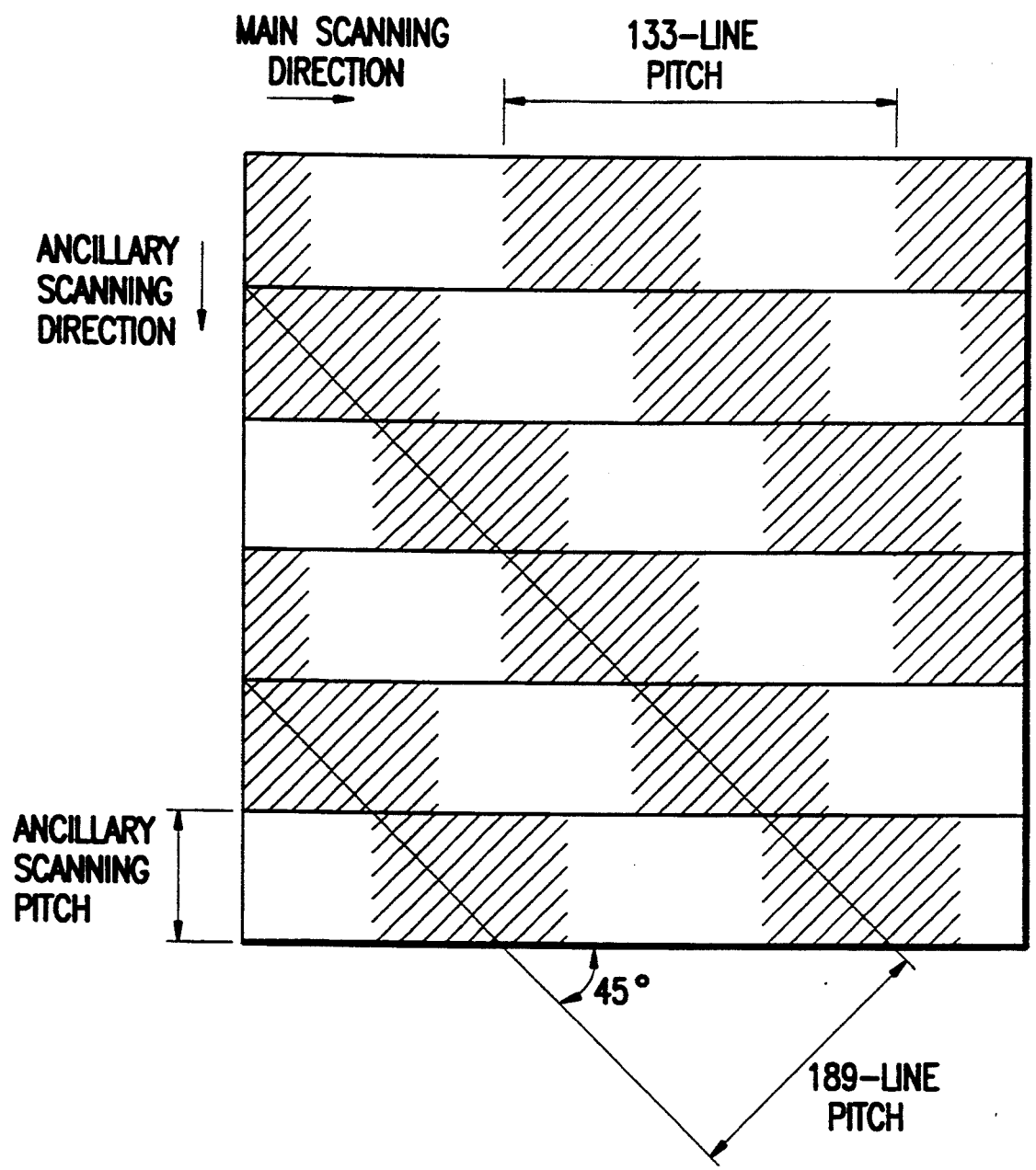
FIG. 8 is a diagram used to explain the single-lined screen for the cyanine image based on the first embodiment.

Specifically, for the screen generator 40a of the mono-color imaging unit 10a which produces the yellow image, a single-lined screen is established to have a screen pitch of 200 lines/inch at a 90° screen angle with respect to the main scanning direction as shown in FIG. 6. For the screen generator 40b of the mono-color imaging unit 10b which produces the magenta image, a single-lined screen is established to have a screen pitch of 224 lines/inch at a 63.5° screen angle with respect to the main scanning direction as shown in FIG. 7, and for the screen generator 40c of the mono-color imaging unit 10c which produces the cyanine image, a single-lined screen is established to have a screen pitch of 188 lines/inch at a 45° screen angle with respect to the main scanning direction as shown in FIG. 8.

More specifically, the single-lined screen for the yellow image has a standard structure of 200 lines and 90° which is used normally. The single-lined screen for the magenta image is based on the standard structure and shifted by ¼ line pitch at every raster scanning, resulting in a 224-line 63.5° screen. In this case, it was confirmed that a 10% line increase from the standard 200 lines to 224 lines does not deteriorate the picture quality significantly. The single-lined screen for the cyanine image is derived from a 133-line 90° screen (1.5-fold pitch relative to the 200-line screen) and shifted by ⅓ line pitch (i.e., shifted by ½ line pitch of the standard 200-line screen) at every raster scanning, resulting in a 189-line 45° screen. In this case, the resulting single-lined screen has the number of lines close to the optimal 200 lines, and the deterioration of picture quality was not observed at all.

Figure 9:
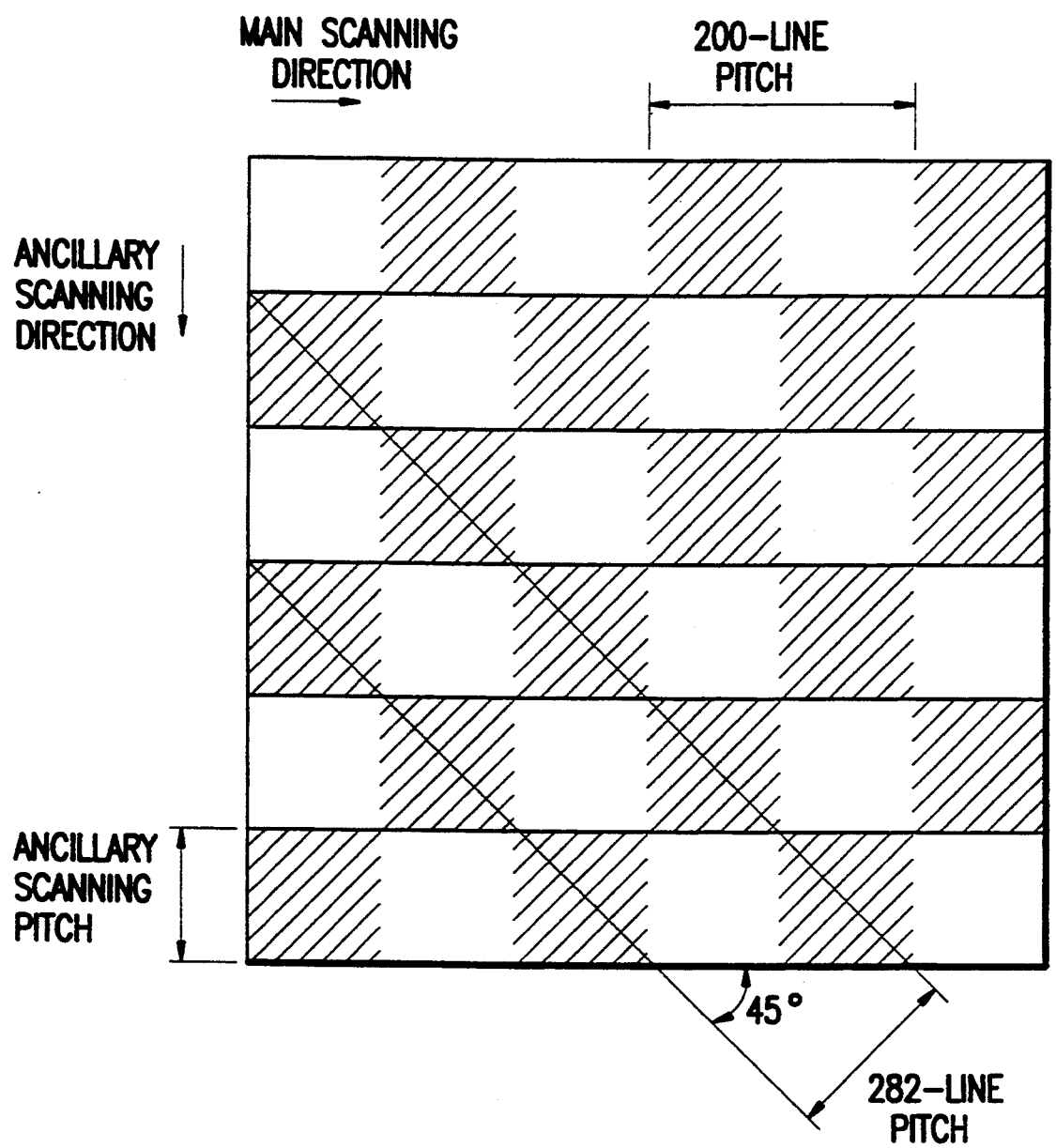
FIG. 9 is a diagram of the single-lined screen for the cyanine image presented as an example for the purpose of comparison.

For the assessment of picture quality resulting from the single-lined screen of cyanine image as an example, a 282-line 45° screen was created, as an object of comparison, by shifting the standard structure by ½ line pitch at every raster scanning, as shown in FIG. 9. The number of lines increases by more than 40%, and consequently the picture quality was deteriorated. Moreover, the shift value is exactly a half line period of the standard screen structure, and therefore lines of the resulting screen structure disperse into dots. Generally, a line-wise screen and a dot-wise screen produce significantly different picture qualities, and it is inconvenient to mix these screen modes among color components. The emergence of tone jump was observed in this case.

The mono-color imaging unit 10d for the black image has its screen angle and line pitch set differently from other units and has its number of lines of screen set close to 200 lines, and therefore it is free from the deterioration of picture quality, although the usual 90° single-lined screen may be used for the black image depending on the demanded picture quality.

Next, a specific arrangement of the line clock generation circuit 43 in the screen generator 40 will be explained.

Figure 10:
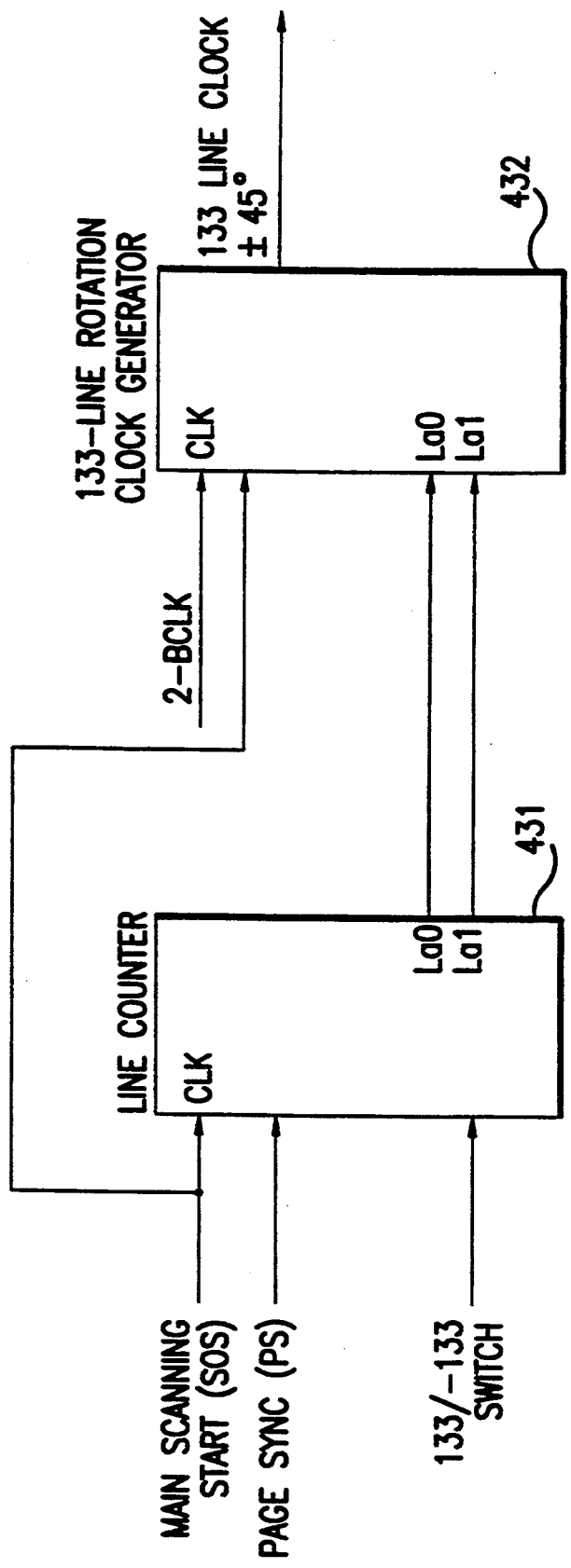
FIG. 10 is a block diagram showing a specific arrangement of the line clock generation circuit for the cyanine image based on the first embodiment.

FIG. 10 shows the line clock generation circuit 43c in the screen generator 40c for the cyanine image. A line counter 431 is enabled by the page sync (PS) signal to count the main scanning sync (SOS) signal and produces 2-bit signals [$L_{a0}$, $L_{a1}$] cyclically in 3-raster period, i.e., [0,0], [0,1], [1,0], [0,0], [0,1], [1,0], and so on.

Figure 11:
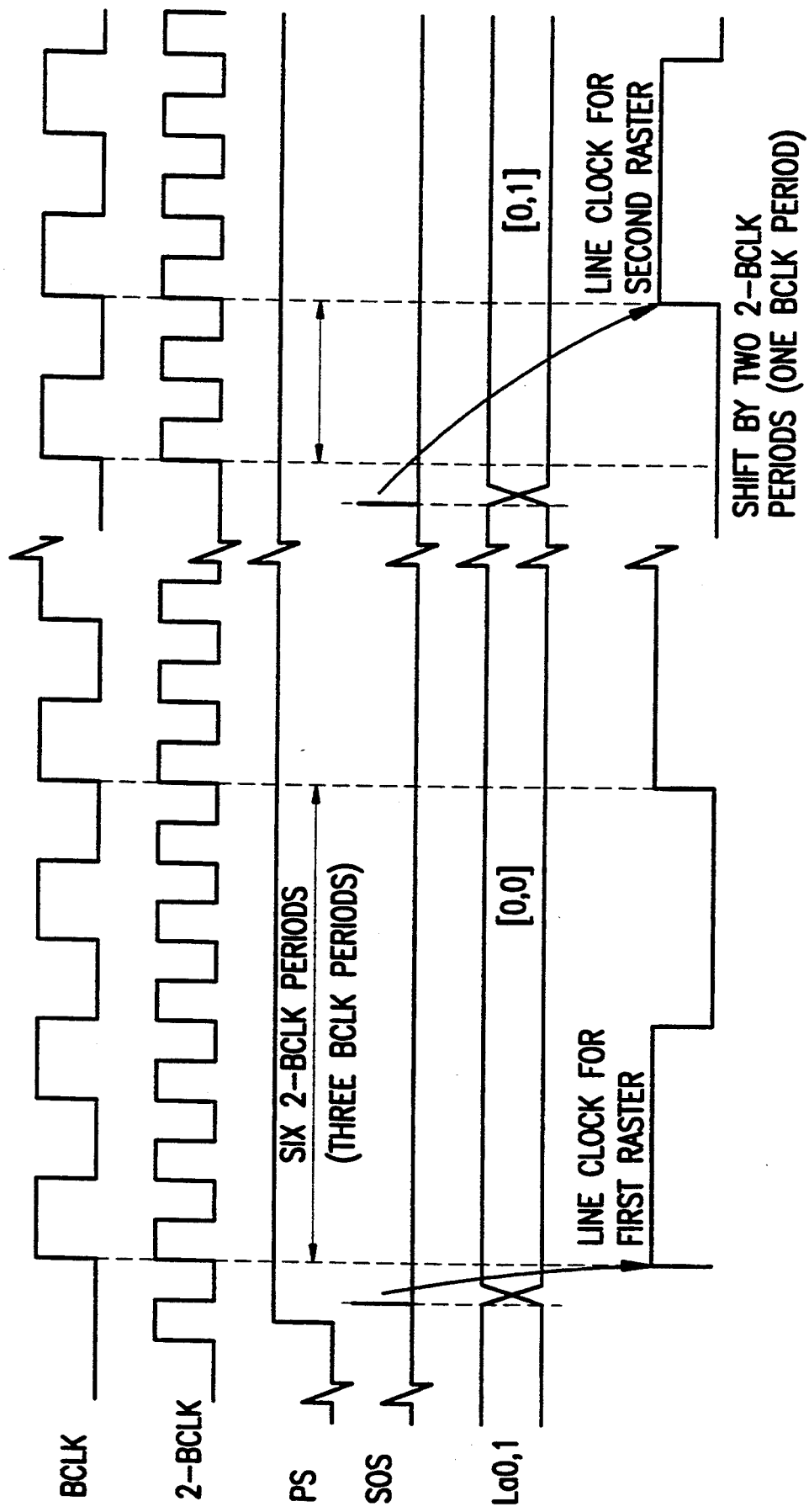
FIG. 11 is a timing chart showing the operation of the line clock generation circuit shown in FIG. 10.

A 133-line rotation clock generator 432 sets the counter circuit with an offset value which is 0, 2 or 4 in response to the 2-bit signal of [0,0], [0,1], or [1,0], respectively, at the entry of the SOS signal, and demultiplies by six the clock (2-BCLK) which is twice the frequency of the sync signal BCLK of pixels for 400 lines (400 SPI). Consequently, a rotation line clock which is demultiplied by three and is shifted by one BCLK clock period at every raster scanning is produced as shown on the timing chart of FIG. 11.

Figure 12:
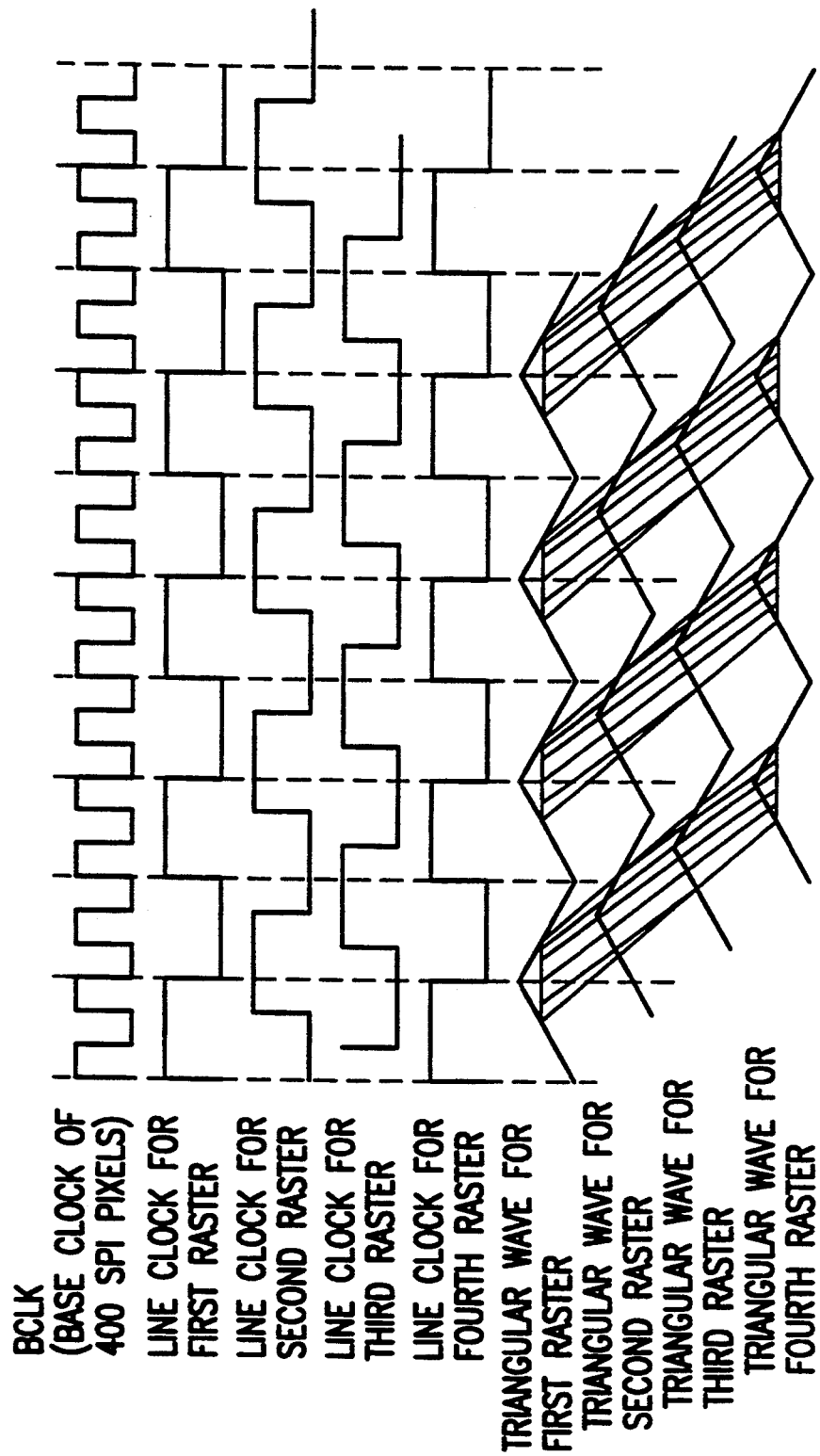
FIG. 12 is a timing chart showing the operation of the screen generator based on the first embodiment.

FIG. 12 is a timing chart showing the operation of the screen generator 40 including the above-mentioned line clock generation circuit 43. From the beginning of the page, the line clock is produced by being delayed by one BCLK clock period each time the line number advances. A triangular wave is produced from the line clock, and when the analog signal which corresponds to the triangular wave and image data is entered to the comparator 45, the screen image of 188 lines and 45° described above is obtained.

The line clock generation circuit 43 of the screen generator 40b for the magenta image is similar to the one for the cyanine image shown in FIG. 10, but it is different in that the line counter 431 produces 2-bit signals [$L_{a0}$,$L_{a1}$] cyclically in 4-raster period, i.e., [0,0], [0,1], [1,0], [1,1], [0,0], [0,1], and so on, and the rotation clock generator 432 sets the counter circuit with an offset value which is 0, 1, 2 or 3 in response to the 2-bit signal of [0,0], [0,1], [1,0], or [1,1], respectively, at the entry of the SOS signal, and demultiplies by four the sync signal BCLK of pixels for 400 lines (400 SPI). Consequently, a rotation line clock which is demultiplied by four and is shifted by one BCLK clock period at every raster scanning is produced.

The line clock generation circuit 43 of the screen generator 40d for the black image is similar to the one for the cyanine image shown in FIG. 10, with a partial alteration being applied as in the case of the circuit for the magenta image.

Embodiment 2

The second embodiment of the invention is designed to set the screen angle of each color component more precisely, with the line pitch of each color component being set to the optimal 200 lines.

Specifically, for a line pitch A in the main scanning direction and a line pitch B with the application of rotation at a screen angle $\theta$, there is a relationship of $A = B/\cos\theta$, and accordingly it is possible to select the value of A depending on the intended value of B.

Figure 13:
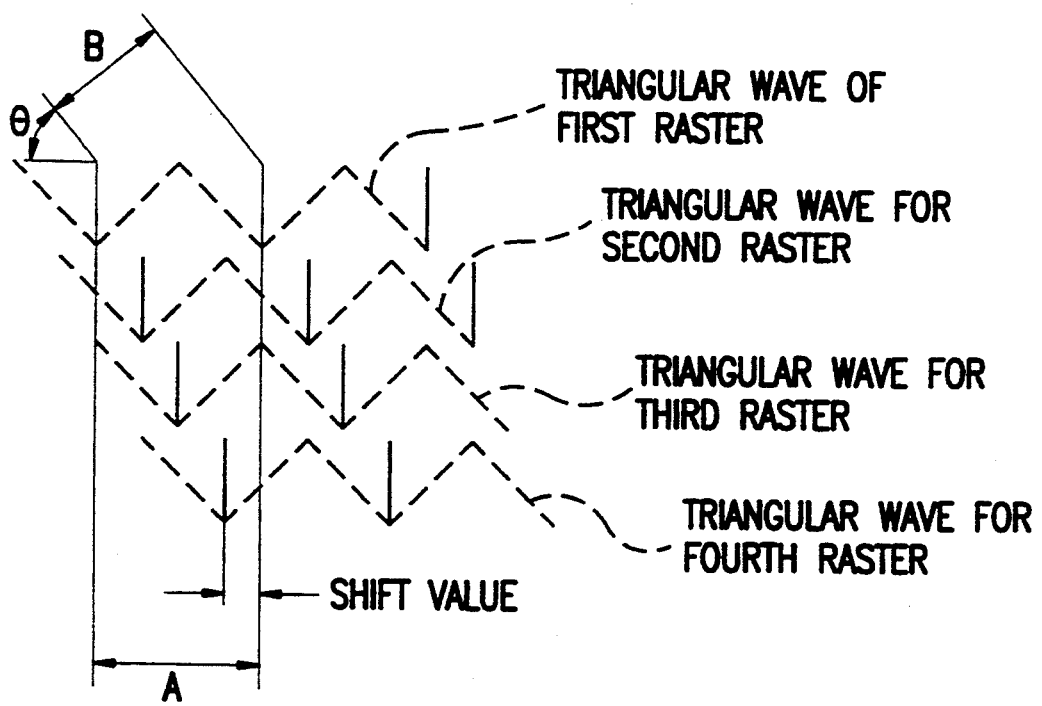
FIG. 13 is a diagram used to explain the single-lined screen for each color component based on a second embodiment of this invention.

The screen angle A is determined from the period of the standard triangular wave, which is determined from the line clock frequency. Accordingly, it is possible to attain the intended screen angle B by setting the line clock frequency properly. For example, in the case of a 200-line 90° single-lined screen created with a 36 MHz line clock, an intended screen angle $\theta$ of 45° can be accomplished by setting the line clock frequency to 25.5 MHz. An intended screen angle $\theta$ can be obtained by shifting the raster scanning start position by a certain value at every scanning, as shown in FIG. 13. The shift value is selected from among 1/n (where n is a positive integer greater than 1) of the above-mentioned screen pitch A. The example of FIG. 13 is the case of n=4.

Figure 14:
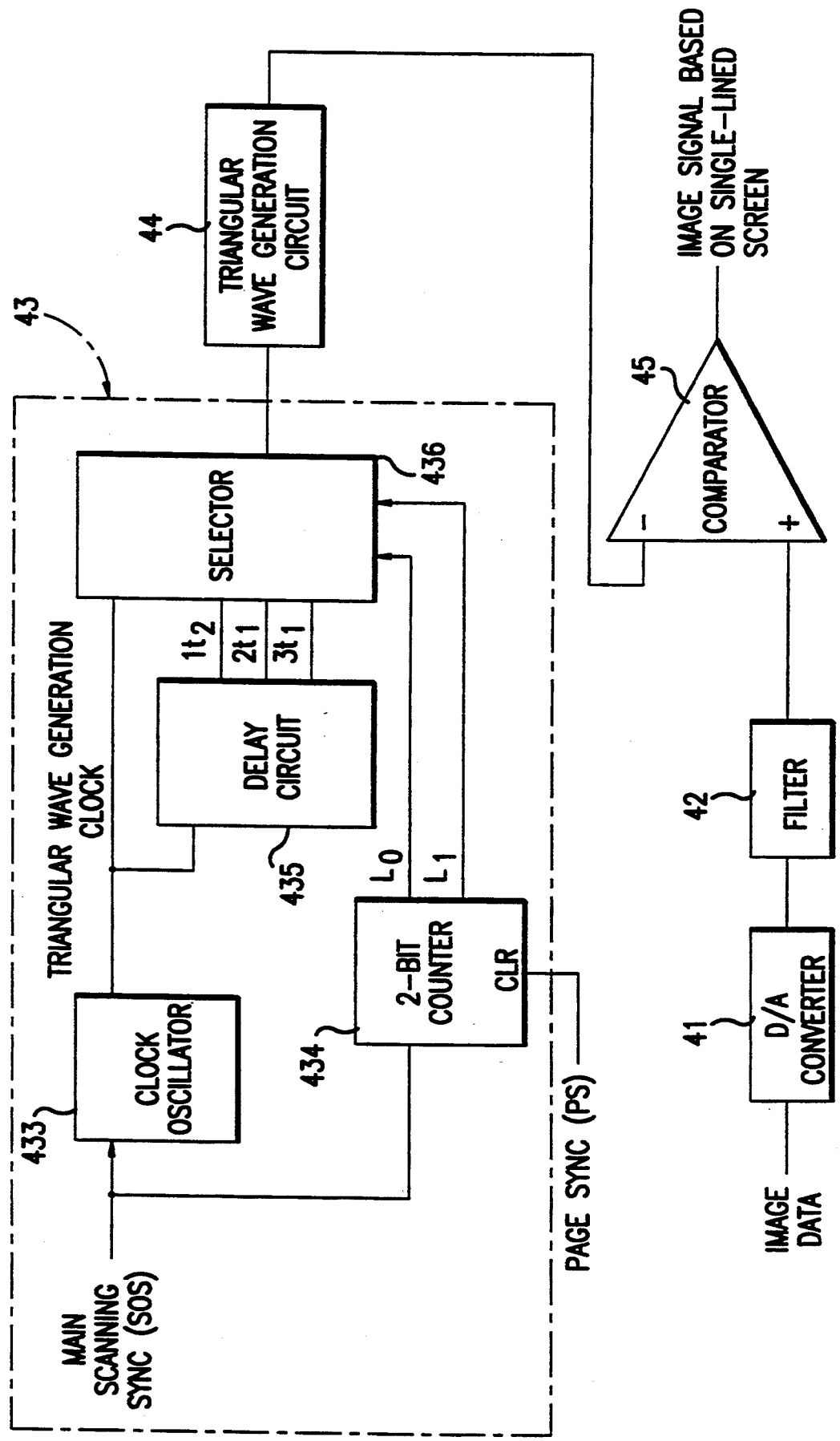
FIG. 14 is a block diagram showing a specific arrangement of the screen generator based on the second embodiment.

FIG. 14 shows a specific arrangement of the screen generator 40 based on the second embodiment of invention. In the figure, functional blocks identical to those of the first embodiment are referred to by the common symbols, and explanation thereof is not repeated.

The screen generator 40 includes a line clock generation circuit 43, which consists of a clock oscillator 433 for generating a clock specific to each color component in synchronism with the main scanning sync (SOS) signal, a 2-bit counter 434 which is cleared by the page sync (PS) signal and adapted to count the SOS signal, a delay circuit 435 which delays the clock provided by the clock oscillator by prescribed time lengths $t_1$, $2t_1$ and $3t_1$ to produce delayed clocks, and a selector 436 which selects one of the crude clock provided by the clock oscillator and the three delayed clocks provided by the delay circuit 435 in response to the output $[L_0, l_1]$ of the 2-bit counter 434.

A triangular wave which is produced from the line clock provided by the line clock generation circuit 43 and an analog signal derived from image data are entered to the comparator 45, and a single-lined screen having the intended line pitch B (corresponding to 200 lines) and the intended screen angle $\theta$ is obtained as shown in FIG. 13.

According to this invention, as described above for its specific embodiments, the single-lined screen images of individual color components are overlapped sequentially on a sheet of print paper, with the screen angle being set differently and the line pitch being set equally among the color components, and consequently even if there is a displacement of screen images among the mono-color imaging units of individual color components, it is possible to make uniform the state of overlapping of the screens while retaining the same screen resolution among the color components, whereby a high-grade color quality can be retained and the degradation of picture quality such as a degraded tone quality can be prevented effectively.

In addition, it is possible for the apparatus to share many of the functional blocks for producing the single-lined screen among the color components, and the structure of the apparatus can be simplified.

What is claimed is:

1. A method of forming a full-color image based on a plurality of mono-color imaging units corresponding to individual color components of full-color images, comprising the steps of forming mono-color toned images of the color components through a single-lined screen process of said mono-color imaging units; overlapping the mono-color toned images to produce a full-color image; varying the screen angle among each of the mono-color toned images; and substantially equalizing the line pitch of the screen for each mono-color toned image.

2. The method of claim 1, wherein the equalizing step includes setting a maximum variance of line screen pitch to about 15%.

3. A full-color image forming apparatus including a plurality of mono-color imaging units corresponding to individual color components of full-color images and adapted to form mono-color images of the color components, and single-line screen process means corresponding to said mono-color imaging units for appending tone information to the mono-color images in the form of single-lined screens each extending along a main scanning direction, in which mono-color toned images formed by said mono-color imaging units are overlapped to produce a full-color image, wherein the apparatus further includes control means for shifting write timing of the single-lined screen for each mono-color toned image by a certain value specific to the color component at every raster scanning and for varying the screen angle among the color components, and screen frequency adjusting means for adjusting the screen spatial frequency of the main scanning direction for each mono-color toned image and for substantially equalizing the line pitch of the screen for all mono-color toned images.

4. A full-color image forming apparatus according to claim 3, wherein said screen write control means includes means for delaying the write timing by a shift value which is 1/n (where n is a positive integer greater than one) of the standard line pitch of the screen in the main scanning direction, and said screen frequency adjusting means includes means for generating a standard spatial frequency of the main scanning direction for the standard single-lined screen and means for demultiplying the standard spatial frequency so that the number of lines of the screen decreases in the main scanning direction.

5. The image forming apparatus of claim 3, wherein the frequency adjusting means sets a maximum variance of all the mono-color toned images to about 15%.

6. An image forming apparatus for a plurality of mono-color imaging units adapted to form mono-color images of color components, comprising
a single-lined screen processor corresponding to said mono-color imaging units and adapted to provide tone information to the mono-color images in the form of single-lined screens each extending along a main scanning direction and to overlap mono-color toned images formed by said mono-color imaging units to produce a full-color image,
a controller, coupled to said processor, and adapted to vary the screen angle among the color components, and
a screen frequency adjuster, coupled to said processor and said controller, and adapted to substantially equalize the line pitch of the screen for all mono-color toned images.

7. The image forming apparatus of claim 6, wherein the frequency adjusting means sets a maximum variance of all the mono-color toned images to about 15%.

* * * * *